(12) United States Patent
Cunningham et al.

(10) Patent No.: US 7,765,264 B2
(45) Date of Patent: Jul. 27, 2010

(54) SELECTION OF BEARER MODE ACCORDING TO MESSAGE CHARACTERISTICS

(75) Inventors: Ivy F. Cunningham, Seattle, WA (US); Christopher A. White, Redmond, WA (US); David E. Brudnicki, Duvall, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 450 days.

(21) Appl. No.: 10/941,805

(22) Filed: Sep. 14, 2004

(65) Prior Publication Data

US 2006/0031342 A1 Feb. 9, 2006

Related U.S. Application Data

(60) Provisional application No. 60/587,792, filed on Jul. 12, 2004.

(51) Int. Cl.
G06F 15/16 (2006.01)
(52) U.S. Cl. ...................... 709/206; 709/203
(58) Field of Classification Search ............... 709/206, 709/203; 379/93.24, 100.08
See application file for complete search history.

(56) References Cited

U.S. PATENT DOCUMENTS

| 5,630,060 | A | * | 5/1997 | Tang et al. | 709/206 |
| 5,812,795 | A | * | 9/1998 | Horovitz et al. | 709/206 |
| 6,781,972 | B1 | * | 8/2004 | Anderlind et al. | 370/329 |
| 6,848,008 | B1 | * | 1/2005 | Sevanto et al. | 709/249 |
| 7,058,417 | B2 | * | 6/2006 | Jeong | 455/466 |
| 7,171,190 | B2 | * | 1/2007 | Ye et al. | 709/206 |
| 2003/0154446 | A1 | * | 8/2003 | Constant et al. | 715/531 |
| 2004/0125756 | A1 | * | 7/2004 | Lepore et al. | 709/227 |

* cited by examiner

*Primary Examiner*—Phuoc Nguyen
(74) *Attorney, Agent, or Firm*—Moazzam & Associates, LLC

(57) ABSTRACT

A data processing device, such as a wireless telephone, includes logic to identify a first recipient address type for a first recipient of a message, and to identify a second recipient address type different than the first recipient address type for a second recipient of the message. A first message bearer mode is selected for the first recipient according to the first recipient address type, and a second message bearer mode different from the first message bearer mode is selected for the second recipient according to the second recipient address type.

13 Claims, 2 Drawing Sheets

SELECTION OF BEARER MODE ACCORDING TO MESSAGE CHARACTERISTICS

PRIORITY CLAIM

Priority is hereby claimed to the United States provisional application for patent entitled SELECTION OF BEARER MODE ACCORDING TO MESSAGE CHARACTERISTICS, having application No. 60/587,792, filed on Jul. 12, 2004.

CROSS-REFERENCE TO RELATED PATENT APPLICATIONS

This application is related to co-pending United States patent applications:

Ser. No. 10/933,677, filed on Sep. 3, 2004, and claiming priority to U.S. Provisional Patent Applications 60/585,965, 60/588,110, 60/588,307, 60/590,185, and 60/590,229;

Ser. No. 10/939,103, filed on Sep. 10, 2004, and claiming priority to U.S. Provisional Patent Applications 60/585,965, 60/588,110, 60/588,307, 60/590,185, and 60/590,229;

Ser. No. 10/940,576, filed on Sep. 14, 2004, and claiming priority to U.S. Provisional Patent Applications 60/588,110, 60/588,307, 60/590,185, and 60/590,229;

Ser. No. 11/092,199, filed on Mar. 28, 2005, and claiming priority to U.S. Provisional Patent Application 60/588,110;

Ser. No. 11/092,511, filed on Mar. 28, 2005, and claiming priority to U.S. Provisional Patent Application 60/588,307;

PCT/US2005/025510, filed on Apr. 15, 2005, and claiming priority to U.S. Provisional Patent Application 60/590,185, and 60/590,229;

PCT/US2005/023808, filed on Jul. 7, 2005, and claiming priority to U.S. Provisional Patent Application 60/588,110;

PCT/US2005/024287, filed on Jul. 7, 2005, and claiming priority to U.S. Provisional Patent Applications 60/585,965, 60/588,110, 60/588,307, 60/590,185, and 60/590,229;

PCT/US2005/024380, filed on Jul. 7, 2005, and claiming priority to U.S. Provisional Patent Application 60/588,307;

PCT/US2005/025509, filed on Jul. 15, 2005, and claiming priority to U.S. Provisional Patent Application 60/590,229;

Ser. No. 12/056,948, filed on Mar. 27, 2008, and claiming priority to U.S. Provisional Patent Application 60/588,110;

Ser. No. 12/057,025, filed on Mar. 27, 2008, and claiming priority to U.S. Provisional Patent Application 60/588,110; and Ser. No. 12/057,065, filed on Mar. 27, 2008, and claiming priority to U.S. Provisional Patent Application 60/588,110.

TECHNICAL FIELD

The present disclosure relates to selection of the bearer mode for a message communicated via a network.

BACKGROUND

Modern communication networks support a variety of mechanisms for communicating information. These mechanisms are referred to herein as bearer modes. A particular bearer mode may be better suited to communicating a particular type of information. For example, a voice bearer mode may be better suited to communicating voice information. A particular bearer mode may be well suited for communicating email, short text messages, or messages including images.

Typically, the bearer mode selected for communication of a message is determined by the application logic employed to compose the message. For example, a message composed using a Short Message Text (SMS) client is communicated using SMS.

As the variety of information communicated via networks increases, so too do the available bearer modes. The many choices may result in a variety of application logic for composing messages, confusing people who use the network to communicate. Complications can arise when a message is addressed (assigned a destination) to multiple recipients. In these situations, one bearer mode may not be the most suitable for communicating the message to all of the designated addresses.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

A recipient address type is identified as one of an email address or a phone number. The bearer mode for the message is selected as the simple mail transfer protocol when the recipient address type is an email address. The bearer mode for the message is selected to one of the short message service, enhanced message service, or multimedia message service when the email address is a phone number. In general, the bearer mode for delivering a message is selected according to a semantic composition of the recipient's address type.

The bearer mode for the message may be selected as the enhanced message service or multimedia message service when the message comprises non-textual information, or to the short message service when the message consists of a short amount of textual information. The bearer mode for the message may be selected according to a bearer mode applied to communicate the message to a recipient from which the message was received, e.g. when the message is a reply or forward, the bearer mode may be selected as the bearer mode applied when the message was delivered to the person and/or device from which the message was replied to/forwarded.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Figure 1:
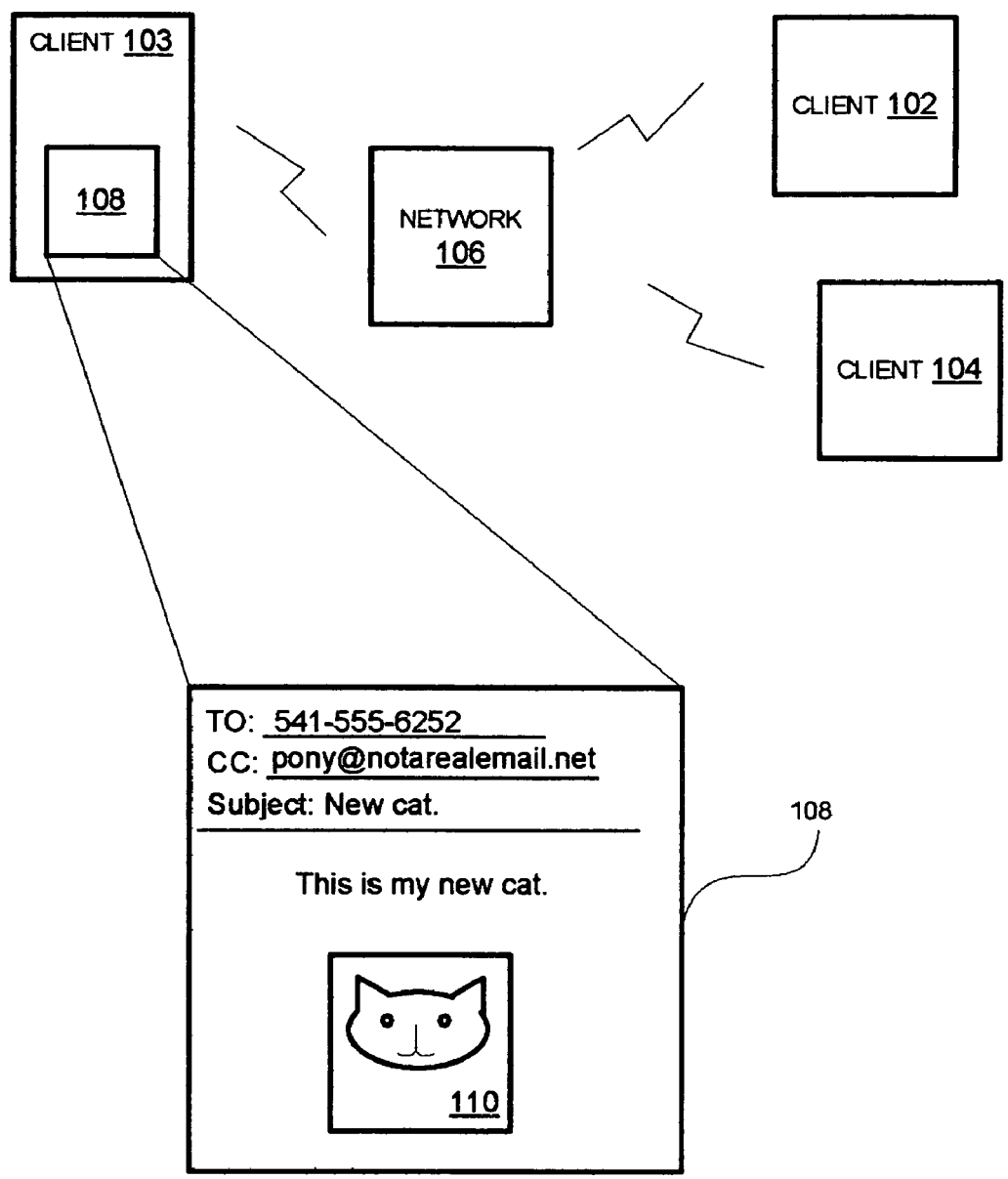
FIG. 1 is a block diagram of an embodiment of a communication environment.

FIG. 1 is a block diagram of an embodiment of a communication environment. The environment comprises communication clients 102, 103, and 104. The environment also comprises a network 106, which is a collection of devices that cooperate to enable communication between the communication clients 102 and 104. One or more of the communication clients 102-104 comprises logic to carry out aspects of the procedures described herein, where logic comprises circuits and/or signals and/or information represented in a machine memory (e.g. software) that may be applied to affect the operation of a device. Communication clients 102-104 may comprise logic to compose, send and receive, and view messages.

The communication client 103 comprises a message 108. In this example the message 108, which is a collection of related information, comprises an image 110.

Client 103 identifies a recipient address type for a recipient of the message 108, the recipient being the party for which the message is intended, and selects a message bearer mode for the recipient based upon a type of the recipient's address. The bearer mode identifies mechanisms by which the message 108 is communicated from the sending client 103 to the receiving client(s). The bearer mode may involve various communication protocols, quality of service characteristics, and the involvement of particular network elements.

The message bearer mode is selected using at least a consideration the recipient(s) address type(s). For example, the client 103 identifies, for the recipient having client 104, a recipient address type different than the address type for the recipient having client 102. Thus the bearer mode selected to deliver the message 108 to the recipient of client 104 differs from the bearer mode selected to deliver the message 108 to the recipient of client 102. In general, client 103 sets a bearer mode for each message recipient determined at least in part by the recipient's address type.

Other factors that may affect the determination of the message bearer mode are the size of the message, the type of content of the message, and the bearer mode applied to communicate the message to a recipient from which the message was received, the latter being a party that forwarded or replied to an earlier message, resulting in communication of the message to the (presently) sending client 103.

The client 103 may also alter at least one of a "reply to" address or a "from" address according to the bearer mode selected for the message 108. For example, when communicating the message 108 via an email bearer mode, the "reply to" address (the address to use when sending replies to a message) may be selected as the sender's email address, even when the recipient did not receive the message via email. When communicating the message 108 to a recipient via SMS (a bearer mode directed to phone numbers), the "reply to" address may be set to the sender's phone number. The sender's "from" address (an indication of an address from which the message was communicated) may also be altered according to the bearer mode selected to communicate the message.

Thus, a single message composition client application may be employed to compose and communicate messages using multiple bearer modes. The suitable bearer mode to apply is selected at least in part according to the recipient address type. The user's messaging environment is thus simplified.

Figure 2:
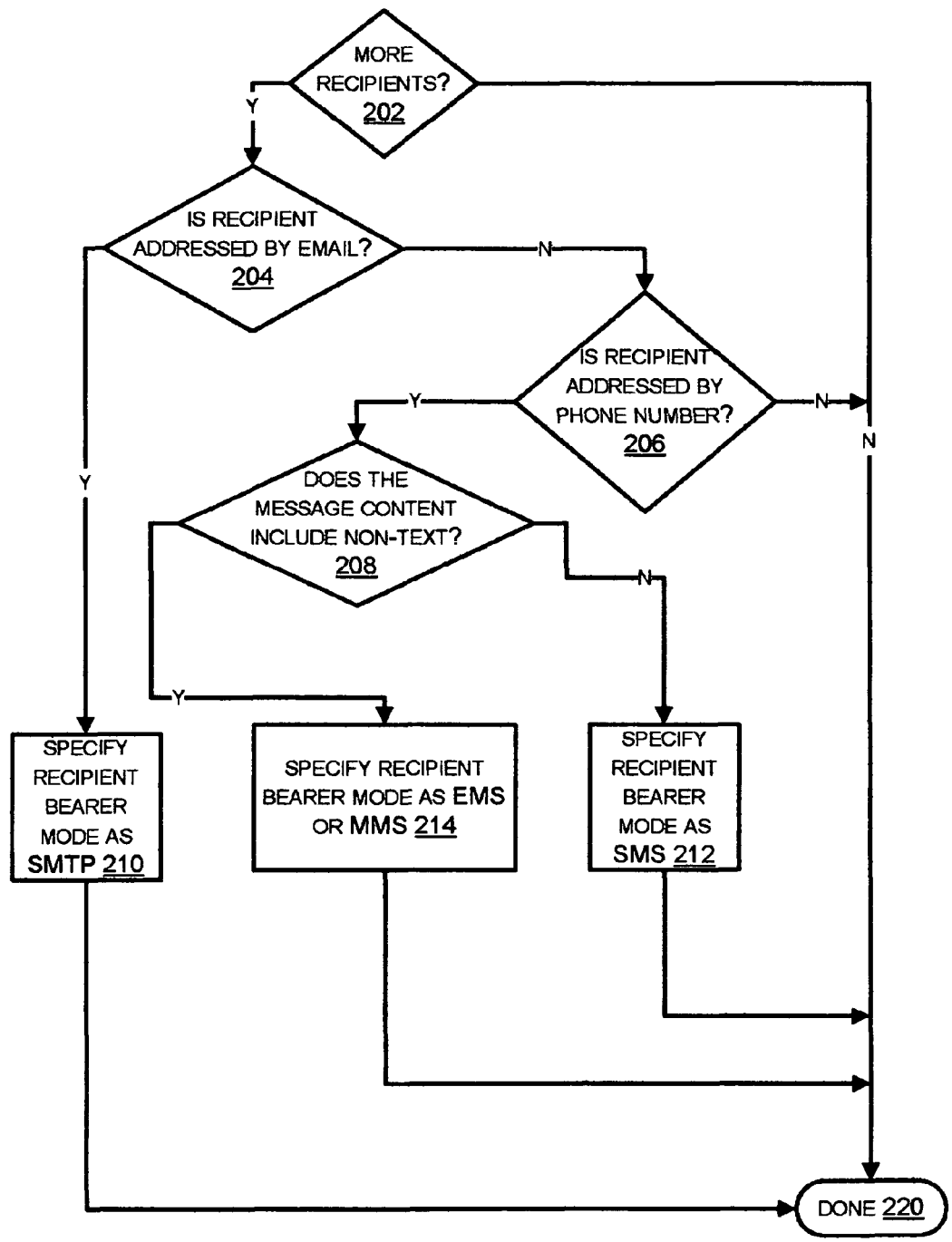
FIG. 2 is a flow chart of an embodiment of a method of setting bearer modes for a communication.

FIG. 2 is a flow chart of an embodiment of a method of setting bearer modes for a communication. If at 202 there are no more recipients for the message, the process concludes at 220. Otherwise, a check is made at 204 to determine if the next recipient is addressed by email. The semantic composition of the recipient address is examined. By semantic composition it is meant the position and frequency of occurrence of symbols and/or groups of symbols within the recipient address. If at 204 the semantic composition of the recipient address indicates that the recipient is addressed by email, the recipient bearer mode is specified as simple mail transfer protocol (SMTP) at 210. If the semantic composition indicates that the recipient is not addressed by email, a check is made at 206 to determine whether the recipient is addressed by phone number. If at 206 the recipient is addressed by phone number, a check is made at 208 to determine whether the message content includes non-text. If so, the recipient bearer mode is specified as short message service (SMS) at 212. If at 208 the message content was determined to not include non-text (put another way, the message is not a short text message), the recipient bearer mode is specified as enhanced message service (EMS) or multimedia message service (MMS) at 214.

Although described in one embodiment in terms of SMTP and SMS/EMS/MMS, the method is applicable in general to the selection of other bearer modes as well.

The process continues in this fashion, examining recipient address type as being one of an email or a phone number, and setting recipient bearer mode based at least in part on the recipient address type, and possibly also the message contents, until there are no more recipients for the message. In this example the bearer modes selected include, as noted: the simple mail transfer protocol (SMTP), a bearer mode suitable for communicating email messages; short message service (SMS), a bearer mode suitable for communicating short text messages; enhanced message service (EMS), a bearer mode suitable for communicating larger amounts of text than SMS, images, and/or other non-textual content types; and multimedia message service (MMS), a bearer mode suitable for communicating EMS content types, as well as video and recorded voice messages.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

What is claimed is:

1. A method comprising:

creating a message on a user's device and addressing the message to a recipient using a recipient address type;

identifying the recipient address type for a first recipient having a first recipient device and a second recipient having a second recipient device, the identification including examining the semantic composition of the first and second recipient addresses and determining a position and a frequency of occurrence of a plurality of symbols within the first and second recipient addresses;

selecting a bearer mode for the message according to the recipient address type of the first or second recipient device based in part upon the identification of the first and second recipient addresses, wherein the creating and addressing are accomplished by the user on the user's device and the identifying and selecting are accomplished by the user's device.

2. The method of claim 1 wherein setting the bearer mode for the message further comprises:

selecting the bearer mode for the message according to a size of the message.

3. The method of claim 1 wherein setting the bearer mode for the message further comprises:

selecting the bearer mode for the message according to a type of content of the message.

4. The method of claim 1 wherein setting the bearer mode for the message further comprises:

selecting the bearer mode for the message according to a bearer mode applied to communicate the message to a recipient from which the message was received.

5. The method of claim 1 further comprising:

altering at least one of a reply to address or a from address according to the bearer mode for the message.

6. A method comprising:

creating a message on a user's device and addressing the message to a recipient using a recipient address type;

identifying the recipient address type for a first recipient having a first recipient device and a second recipient having a second recipient device, the identification including examining the semantic composition of the first and second recipient addresses and determining a position and a frequency of occurrence of a plurality of symbols within the first and second recipient addresses, the recipient address type being one of an email address and a phone number;

selecting a bearer mode of the message as the simple mail transfer protocol when the recipient address type is an email address; and selecting the bearer mode of the message as one of the short message service, enhanced message service, or multimedia message service when the recipient address is a phone number, wherein the selection of bearer mode is based in part upon the identification of the first and second addresses, and wherein the creating and addressing are accomplished by the user on the user's device and the identifying and selecting are accomplished by the user's device.

7. The method of claim 6 wherein selecting the bearer mode of the message as one of the short message service, enhanced message service, or multimedia message service further comprises:

Selecting the bearer mode of the message as one of the enhanced message service or multimedia message service when the message comprises non-textual information, and selecting the bearer mode of the message as the short message service when the message consists of a short amount of textual information.

8. The method of claim 6 further comprising:

Selecting the bearer mode of the message according to a bearer mode applied to communicate the message to a recipient from which the message was received.

9. A data processing device comprising logic to:

identify a first recipient address type for a first recipient of a message;

identify a second recipient address type different than the first recipient address type for a second recipient of the message;

select a first message bearer mode for the first recipient according to the first recipient address type; and select a second message bearer mode different from the first message bearer mode for the second recipient according to the second recipient address type, wherein a user creates a message on the data processing device and addresses the message to the first recipient and second recipient using the first recipient address type and second recipient address type, and wherein the identification includes examining the semantic composition of the first and second recipient addresses and determining a position and a frequency of occurrence of a plurality of symbols within the first and second recipient addresses.

10. The data processing device of claim 9 further comprising logic to:

identify the recipient address type as one of an email address or a phone number.

11. The data processing device of claim 10 further comprising logic to:

select the bearer mode for the message to the simple mail transfer protocol when the recipient address type is an email address.

12. The data processing device of claim 10 further comprising logic to:

select the bearer mode for the message to one of short message service, enhanced message service, or multimedia message service when the recipient address type is a phone number.

13. A method comprising:

a user creating a message on a client communication device;

the user addressing the message to a recipient address;

the client communication device identifying the recipient address type according to a semantic composition of the recipient address, the identifying further including determining a position and a frequency of occurrence of a plurality of symbols within the recipient address; and the client communication device selecting a bearer mode for a message to the recipient according to the recipient address type.

* * * * *